(12) United States Patent
Huh et al.

(10) Patent No.: US 6,252,783 B1
(45) Date of Patent: Jun. 26, 2001

(54) SWITCHING POWER SUPPLY HAVING A LOW POWER BURST MODE

(75) Inventors: Dong-Young Huh; Jung-Yul Yun, both of Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 09/545,919

(22) Filed: Apr. 10, 2000

(30) Foreign Application Priority Data

Apr. 10, 1999 (KR) .................................................. 99-12651

(51) Int. Cl.[7] .................................................. H02M 3/335
(52) U.S. Cl. ........................................... 363/21.01; 363/97
(58) Field of Search ..................... 363/16, 21.01, 363/21.07, 21.15, 95, 97

(56) References Cited

U.S. PATENT DOCUMENTS 5,453,921  *  9/1995  Shutts ...................................... 363/21

6,118,675  *  9/2000  Lionetto et al. ........................ 363/21

* cited by examiner

Primary Examiner—Jessica Han
(74) Attorney, Agent, or Firm—Marshall, O'Toole, Gerstein, Murray & Borun

(57) ABSTRACT

A switching power supply includes a power switch and a mode controller that provides a mode control signal having a first level associated with a normal mode of operation of the switching power supply and a second level associated with a standby mode of operation of the switching power supply. The switching power supply further includes a feedback circuit coupled to the mode controller and a switching controller coupled to the feedback circuit. The feedback circuit has a voltage controlled current source that provides a feedback current which varies in response to the mode control signal. The switching controller switches the power switch in response to the feedback current so that in the normal mode of operation the power switch switches continuously at a predetermined frequency and in the standby mode of operation the power switch is switched on and off in bursts having a predetermined frequency.

17 Claims, 5 Drawing Sheets

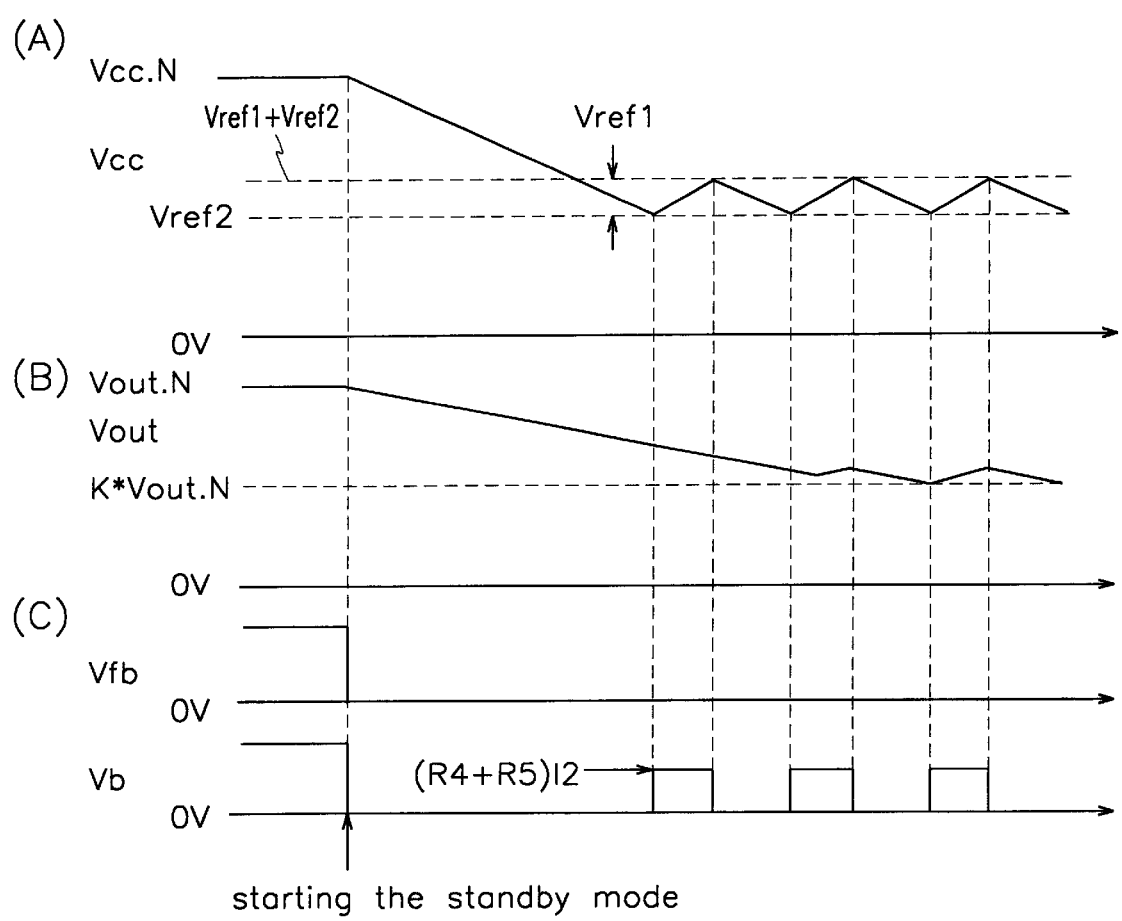

SWITCHING POWER SUPPLY HAVING A LOW POWER BURST MODE

BACKGROUND OF THE INVENTION

1. Field of the Invention

The invention relates generally to switching power supplies and, more particularly, the invention relates to a switching power supply having a low power burst mode.

2. Description of Related Technology

Generally speaking, a switching power supply (SPS) provides a cost-effective and energy-efficient device for converting energy from a single direct current (TC) supply voltage into one or more DC output voltages that have a greater or lesser magnitude than the supply voltage. SPSs are commonly used to power electronic devices, particularly battery powered devices such as portable cellular telephones, laptop computers, etc., that have a normal operating mode, in which the devices consume a relatively large amount of power, and a standby operating mode (e.g., a sleep mode), in which the devices consume relatively little power. Typically, these electronic devices automatically reenter the standby operating mode when a user has not interacted with the device for a predetermined amount of time and automatically enter the normal operating mode when the user interacts in some manner with a control button, mouse, etc. of the device.

In conventional electronic devices, a standby operating mode is accomplished by either reducing the output voltage of the power supply within the devices or, alternatively, establishing a source of auxiliary power for the devices. However, both of these conventional approaches are undesirable because they require additional components, which results in higher production costs, and because there is an output voltage below which the device will not function, thereby limiting the amount that the power consumption of the device can be decreased. Additionally, when using a conventional SPS in a standby operating mode, a substantial switching loss occurs within the SPS despite any reduction in power consumption due to a reduced output voltage. More specifically, a conventional SPS varies the duty cycle of a power switch (e.g., a transistor) to compensate for changes in power requirements at the output of the supply and operates at a predetermined frequency regardless of the amount of power supplied. As a result, the power switch within a conventional SPS operating in a standby mode changes states (i-e., turns on and off) at the same rate as when the SPS is operating in a normal mode. In the standby operating mode, these switching transitions consume a significant amount of power, which significantly increases the lower limit of power consumption in the standby mode.

SUMMARY OF THE INVENTION

It In accordance with one aspect of the invention, a switching power supply includes a mode controller that provides a first mode control signal and a second. mode control signal. The power supply may further include a feedback circuit coupled to the mode controller that provides a first feedback signal based on the first mode control signal and a second feedback signal based on the second mode control signal. A switching controller coupled to the feedback circuit may generate a continuous fixed frequency signal in response to the first feedback signal and a series of fixed frequency burst signals in response to the second feedback signal.

In accordance with another aspect of the invention, a switching power supply includes a power switch and a mode controller that provides a mode control signal having a first level associated with a normal mode of operation of the switching power supply and a second level associated with a standby mode of operation of the switching power supply. The switching power supply may further include a feedback circuit coupled to the mode controller having a voltage controlled current source that provides a feedback current which varies in response to the mode control signal and a switching controller coupled to the feedback circuit and the power switch. The switching controller may switch the power switch in response to the feedback current so that in the normal mode of operation the power switch switches continuously at a predetermined frequency and in the standby mode of operation the power switch may be switched on and off in bursts having a predetermined frequency.

The invention itself, together with further objectives and attendant advantages, will best be understood by reference to the following detailed description, taken in conjunction with the accompanying drawings and the appended claims.

BRIEF DESCRIPTION OF THE DRAWINGS

FIG. 5 is a graphical representation of signals associated with the switching power supply circuit of FIGS. 1, 3, and 4.

DETAILED DESCRIPTION OF THE PREFERRED EMBODIMENTS

The SPS described herein uses active circuitry to provide a normal mode of operation and a low power burst mode of operation that enables standby operation of an electronic device. In the normal mode of operation, the active circuitry couples the output voltage of the SPS to a conventional switch driver circuit. This switch driver circuit modulates the duty cycle of a fixed frequency switch driver output to regulate the output voltage of the SPS to a desired level.

In the low power burst mode of operation, the active circuitry decouples the output voltage of the SPS from the switch driver circuit and applies a periodic signal to the switch driver. This periodic signal causes the switch driver to provide a fixed frequency output signal for intervals of time (i.e., bursts) that are interleaved with intervals of time during which the output of the switch driver is inactive (i.e., turned off). More specifically, in the low power burst mode of operation, the active circuitry applies an input signal to the switch driver that causes the switch driver to turn the switch on and off at a fixed frequency at about a minimum duty cycle. The bursts during which the switch driver provides its minimum duty cycle fixed frequency output are controlled so that a supply voltage to the switch driver varies between two reference voltages.

Figure 1:
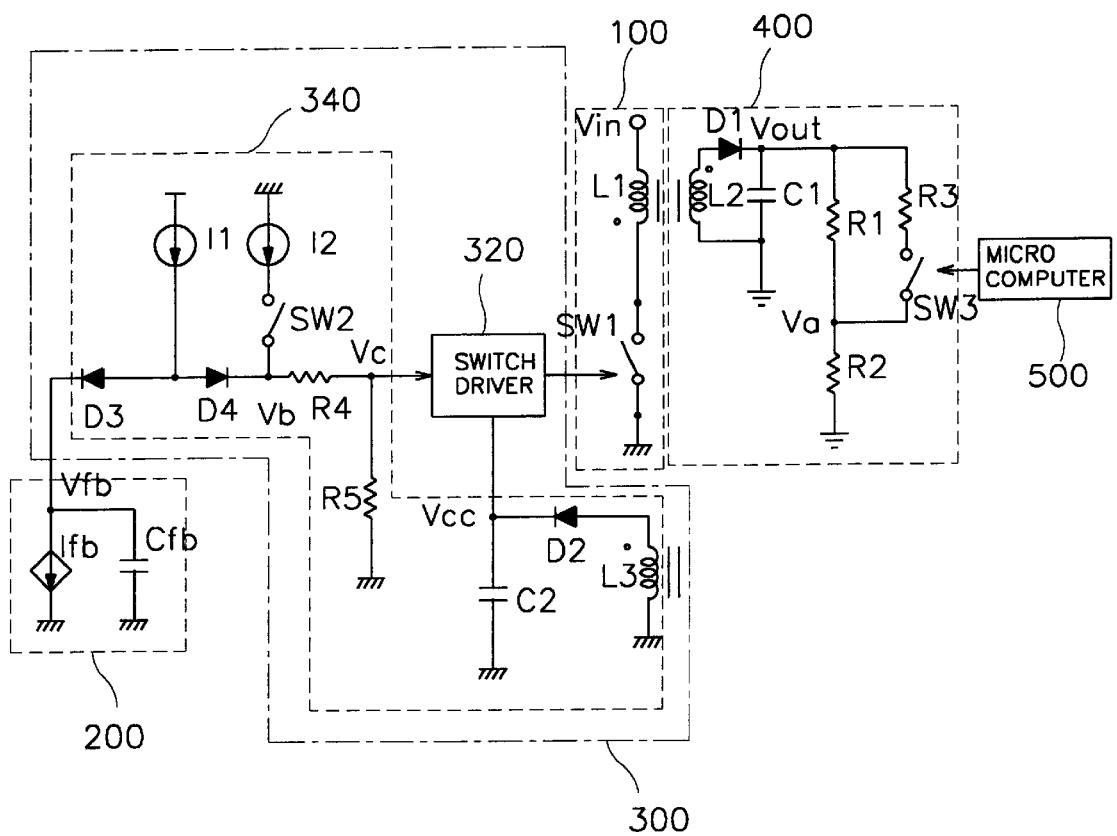
FIG. 1 is an exemplary schematic diagram of a switching power supply having a low power burst mode.

FIG. 1 is an exemplary schematic diagram of a SPS having a low power burst mode. The SPS includes a flyback generator 100, a feedback circuit 200, a switching controller 300, a mode controller 400 and a microcomputer 500. The flyback generator 100 includes a primary winding L1 connected to a source of power Vin and a power switch SW1 that is connected in series between one end of the primary winding L1 and a reference potential. As is commonly known, closing and opening of the power switch SW1 causes energy to be stored as a magnetic field via the primary winding L1 and transferred to a secondary winding L2 within the mode controller 400. Because the flyback generator 100 operates by transferring energy between the primary and secondary windings L1 and L2, the turns ratio of the windings L1 and L2 may be adjusted to either increase or decrease the voltage associated with the power source Vin as needed for a particular application.

The mode controller 400 includes the secondary winding L2, a rectifier diode D1, a filter capacitor C1, resistors R1–R3 and a switch SW3. The rectifier diode D1 rectifies the current pulses provided by the secondary winding L2 and the filter capacitor C2 filters and smooths the rectified current pulses to form a substantially direct current output voltage Vout. The resistors R1–R3 and the switch SW3 are connected to form a resistive divider network that provides a mode control voltage Va to the feedback circuit 200. With the switch SW3 in the open position, the resistor R3 is disconnected from the resistive network and the mode controlling voltage Va=Vout*(R2/(R1+R2)). With the switch SW3 in the closed position, the resistor R3 is connected to the resistive network so that the mode controlling voltage Va=Vout*(R2/(R1*R3/(R1+R3)+R2)), which is greater voltage than provided with the switch SW3 in the open position.

The microcomputer 500 controls the switch SW3 so that the switch SW3 is normally in the open position and is changed to a closed position when a user and/or the electronic device powered by the supply requests standby operation of the electronic device. Additionally, the microcomputer 500 may include any conventional microprocessor or microcontroller coupled to a memory (not shown) that executes program instructions stored within the memory.

The feedback circuit 200 includes a voltage-controlled current source Ifb and a capacitor Cfb. The voltage-controlled current source Ifb provides a current is that is proportional to the mode controlling voltage Va. Specifically, as the mode controlling voltage Va increases, the current provided by the voltage-controlled current source Ifb increases.

The switching controller 300 provides a switching signal that controls the operation of the power switch SW1 based on the level of the mode controlling voltage Va and the feedback current provided by the feedback circuit 200. The switching controller 300 includes a switching control signal generator 340 and a switch driver 320. The switching control signal generator 340 includes diodes D2–D4, resistors R4 and R5, capacitor C2, current sources I1 and I2, a secondary winding L3, and a switch SW2, all connected as shown in FIG. 1. The secondary winding L3 receives energy from the switching action of the flyback generator 100 and produces current pulses that are rectified, filtered and smoothed by the diode D2 and capacitor C2 to provide a substantially direct current supply voltage Vcc to the switch driver 320. The operation of the switch SW2 is controlled by the level of the supply voltage Vcc. Specifically, when the supply voltage Vcc falls below a first reference voltage, the switch SW2 is turned on or closed and when the supply voltage Vcc exceeds a second reference voltage greater than the first reference voltage, the switch SW2 is turned off or opened. The diodes D3 and D4 function as current steering diodes that divert some or all of the current provided by the current source I1 toward the feedback circuit 200 and/or toward the resistors R4 and R5. As will be discussed in greater detail below, this current steering function of the diodes D3 and D4 depends on the current provided by the voltage-controlled current source Ifb and the position of the switch SW2. The resistors R4 and R5 are series connected to provide a control voltage Vc=R5/(R4+R5) to the switch driver 320.

The switch driver 320 may be any conventional drive circuit that converts the control voltage signal Vc into a fixed frequency variable duty cycle drive signal for changing the state of the power switch SW1. For example, the switch driver circuit 320 may include a gate drive circuit in the case where the power switch SW1 is an insulated gate bipolar junction transistor (IGBJT) or a metal oxide semiconductor field effect transistor (MOSFET).

In normal mode operation, the microcomputer 500 opens the switch SW3 so that the output voltage Va=Vout*(R2/(R1+R2)) and the switch driver supply voltage Vcc is greater than the second reference voltage so that the switch SW2 is open, which prevents the current source I2 from providing current to the resistors R4 and R5. The current provided by the voltage controlled current source Ifb is proportional to the mode control voltage Va and, preferably, is less than the current provided by the current source I1. Thus, a portion of the current equal to the current provided by the voltage controlled current source Ifb is diverted from the current source I1 through the diode D3 and the remainder of the current provided by the current source Ifb is diverted through diode D4 and resistors R4 and R5. As a result, a voltage Vfb is developed across the capacitor Cfb, a voltage Vb=Vfb is developed across the resistors R4 and R5, and the control voltage Vc=Vb*(R51(R4+R5)). Accordingly, in the normal mode of operation, as the output voltage Vout increases, the control voltage Vc decreases, which reduces the duty cycle of the switch driver 320 output signal. Similarly, as the output voltage Vout decreases, the control voltage Vc increases, which increases the duty cycle of the switch driver 320 output signal. In any event, those skilled in the art will recognize that in the normal mode of operation, the mode controller 400, the feedback circuit 200, and the switching controller 300 cooperate to vary the duty cycle of the switch driver 320 output to maintain the output voltage Vout at a desired level.

In the standby or lower power burst mode, the microcomputer 500 closes the switch SW3, which substantially increases the mode control voltage Va. As a result, the current provided by the voltage controlled current source Ifb increases to exceed the current provided by the current source I1, the capacitor Cfb does not charge, and the feedback voltage Vfb remains substantially near zero volts Because the switch SW2 remains open, the voltage Vb and the control voltage Vc are also substantially near zero volts, which turns the switch driver 320 off so that the power switch SW1 remains in the open condition.

With the power switch SW1 in the open condition, the secondary winding L3 stops delivering current pulses through the diode D2 and the supply voltage Vcc across the capacitor C2 begins to decrease. When the supply voltage Vcc falls below the first reference voltage, the switch SW2 closes and the current source I2 delivers a current to the resistors R4 and R5 to generate a voltage Vb=I2*(R4+R5) and a control voltage Vc=Vb*(R5/(R4+R5)). None of the current provided by the current source I2 is diverted through the diode D3 because the voltage Vb is greater than the voltage Vfb which reverse biases the diode D4. Preferably, although not necessarily, the control voltage Vc (with the switch SW2 in the on position) is selected so that the switch driver 320 operates at about the minimum allowable duty cycle for proper operation of the switch driver 320.

With the switch SW2 on or closed, the switch driver 320 provides a minimum duty cycle control signal to the power switch SW1 and, as a result, the secondary winding L3 begins to supply current pulses through the diode D2, which are filtered and smoothed by the capacitor C2 and which cause the supply voltage Vcc to increase. When the supply voltage Vcc increases to exceed a second reference voltage (which is greater than the first reference voltage) the switch SW2 is turned off or opened so that the voltages Vb and Vc return to substantially near zero volts and the switch driver 320 again turns off and holds the power switch SW1 in the off or open condition. The supply voltage Vcc begins to decrease and the above-described cycle repeats.

Thus, in the low power burst mode of operation, the output voltage Vout and the feedback circuit 200 are decoupled from the switching controller 300 and the supply voltage Vcc limit cycles between two reference voltages to periodically turn the switch SW2 on and off. When the switch SW2 is on, the switch driver 320 provides a minimum duty cycle output signal to the power switch SW1 and, when the switch SW2 is off, the switch driver 320 is off and the power switch SW1 remains in the open or off condition, thereby significantly reducing switching losses.

Figure 2:
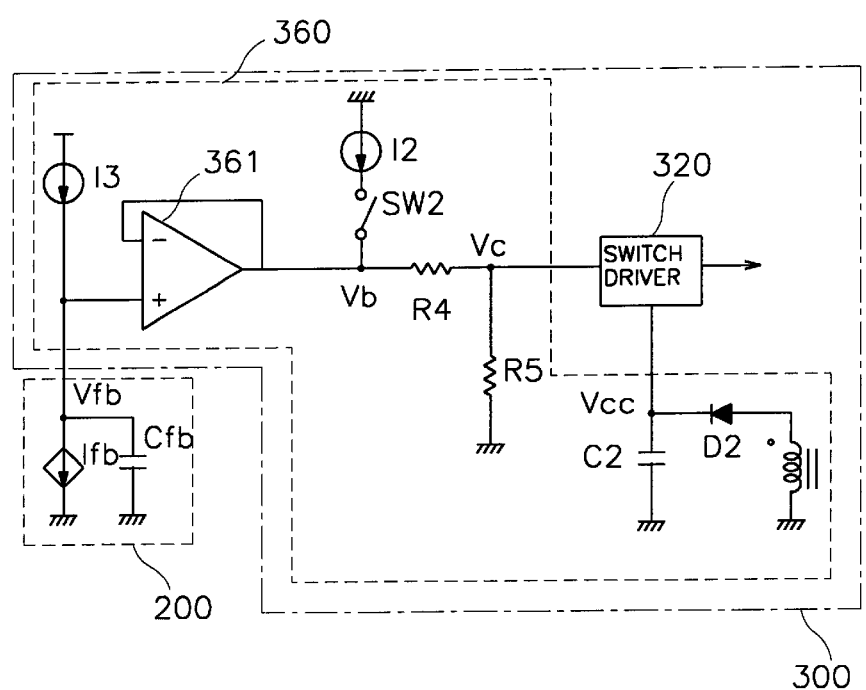
FIG. 2 is an exemplary schematic diagram of an alternative switching controller circuit that may be used with the switching power supply of FIG. 1.

FIG. 2 is an exemplary schematic diagram of an alternative switching controller circuit 300 that may be used with the switching power supply of Fig.1. In particular, a switching control signal generator 360 uses a voltage follower circuit 361 to eliminate the current steering diodes D3 and D4 that are used with the switching control signal generator 340 shown in FIG. 1. The operation of the alternative switching control signal generator 360 is similar to the switching control signal generator 340 that is described in detail above.

Figure 3:
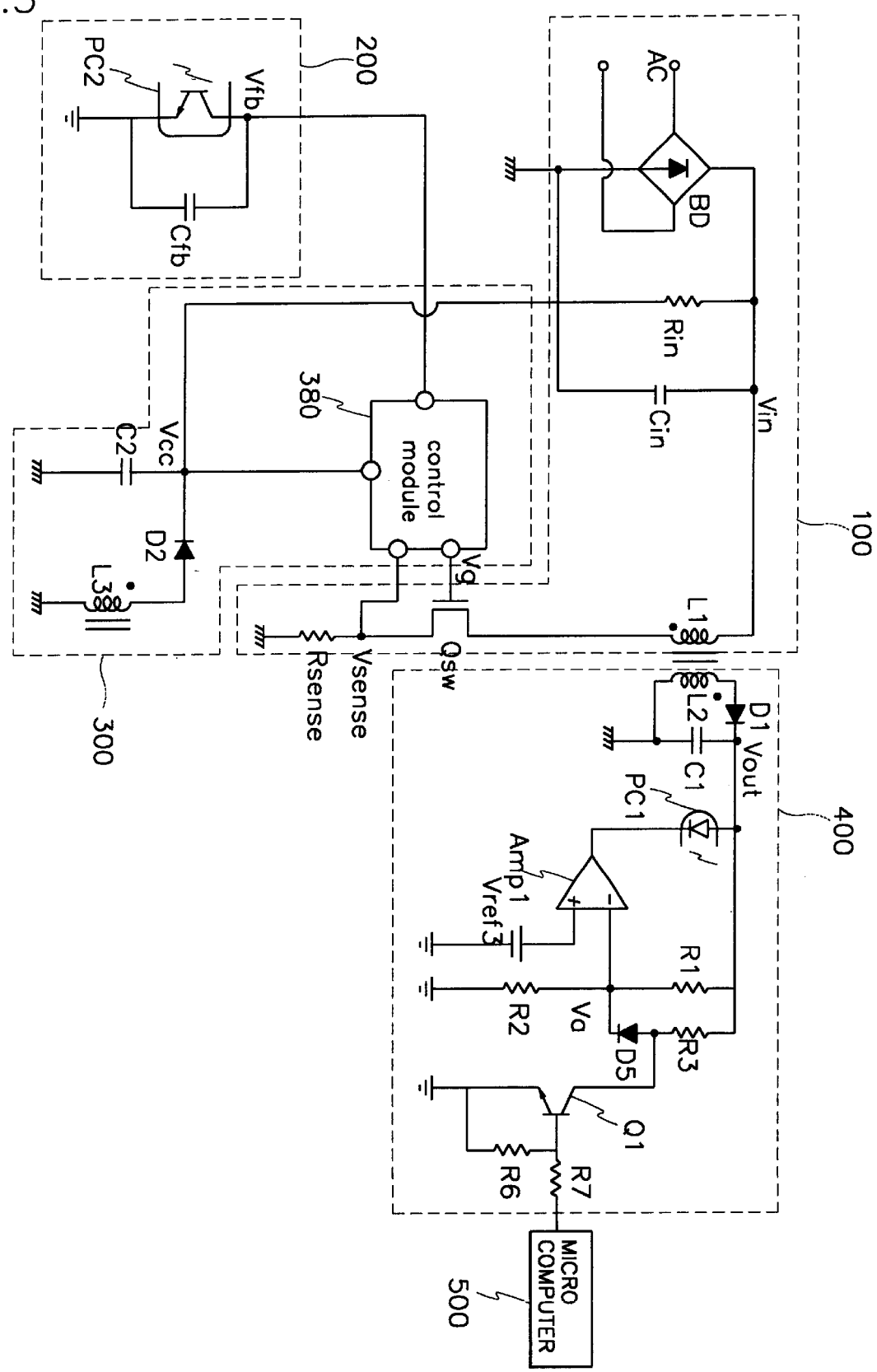
FIG. 3 is a more detailed partial schematic diagram of the switching power supply of FIG. 1.

FIG. 3 is a partial schematic diagram of the switching power supply of FIG. 1 that illustrates in greater detail the flyback generator 100, the mode controller 400 and the feedback circuit 200. As shown in FIG. 3, the flyback generator 100 includes a diode bridge rectifier BD that full wave rectifies an alternating current input voltage (i.e., a line voltage) and a filter capacitor Cin that filters and smooths current pulses received from the bridge rectifier BD so that the supply voltage Vin is a substantially direct current voltage. The flyback generator 100 also includes a bootstrap resistor Rin that provides an initial charging current to the capacitor C2, which functions to increase the supply voltage Vcc to initiate operation of a control module 380. Still further, as shown in FIG. 3, the power switch SW1 may be a MOSFET Qsw, and a current sense resistor Rsense may be used to provide current feedback to the control module 380.

The mode controller 400 may use a transistor Q1, resistors R6 and R7 and a diode D5 to accomplish the function of the switch SW3. In particular, in the normal mode of operation, the microcontroller 500 provides a logical high output signal to the resistor R7, which turns the transistor Q1 on, reverse biases the diode D5 and effectively disconnects the resistor R3 from the resistors R2 and R3 so that the mode control voltage Va=Vout*(R2/(R1+R2)). The mode controller 400 also includes a photo diode PC1 which is driven by an error amplifier Amp1 having a non-inverting terminal connected to a reference voltage Vref3 and an inverting terminal connected to the mode control voltage Va. In the normal mode of operation, if the mode control voltage Va is greater than the reference voltage Vref3 (i.e., the output voltage Vout is too high), the output of the error amplifier Amp1 transitions to a low level to sink current through the photo diode PC1. On the other hand, if the mode control voltage Va is less than the reference voltage Vref3 (i.e., the output voltage Vout is too low), the output of the error amplifier Amp1 transitions to a high level and no current flows through the photo diode PC1. Thus, in the normal mode of operation, a quiescent control condition is reached when the mode control voltage Va equals the reference voltage Vref3.

The feedback circuit 200 includes a photo transistor PC2 that is optically coupled to the photo diode PC1. Thus, in the normal mode of operation, when the mode control voltage Va is greater than the reference voltage Vref3, current is passed through the photo diode PC1 and photons emitted by the photo diode PC1 are coupled to the photo transistor PC2, which turns the photo transistor PC2 on and appropriately modulates the feedback voltage Vfb to adjust the duty cycle of the control module, thereby compensating for the error in the output voltage Vout. Likewise, when the mode control voltage Va is less than the reference voltage Vref3, the photo diode PC1 is off and the photo transistor PC2 is off. Thus, those skilled in the art will recognize that the error amplifier Amp1, the photo diode PC1, and the photo transistor PC2 form a voltage-controlled current source such as the voltage-controlled current source Ifb shown in FIG. 1. Additionally, those skilled in the art will recognize that, in the normal mode of operation, the error amplifier Amp1 forms a servo-type control loop in which the amplifier Amp1 provides appropriate drive signals to the photo diode PC1 so that the mode control voltage Va is substantially equal to the reference voltage Vref3.

Figure 4:
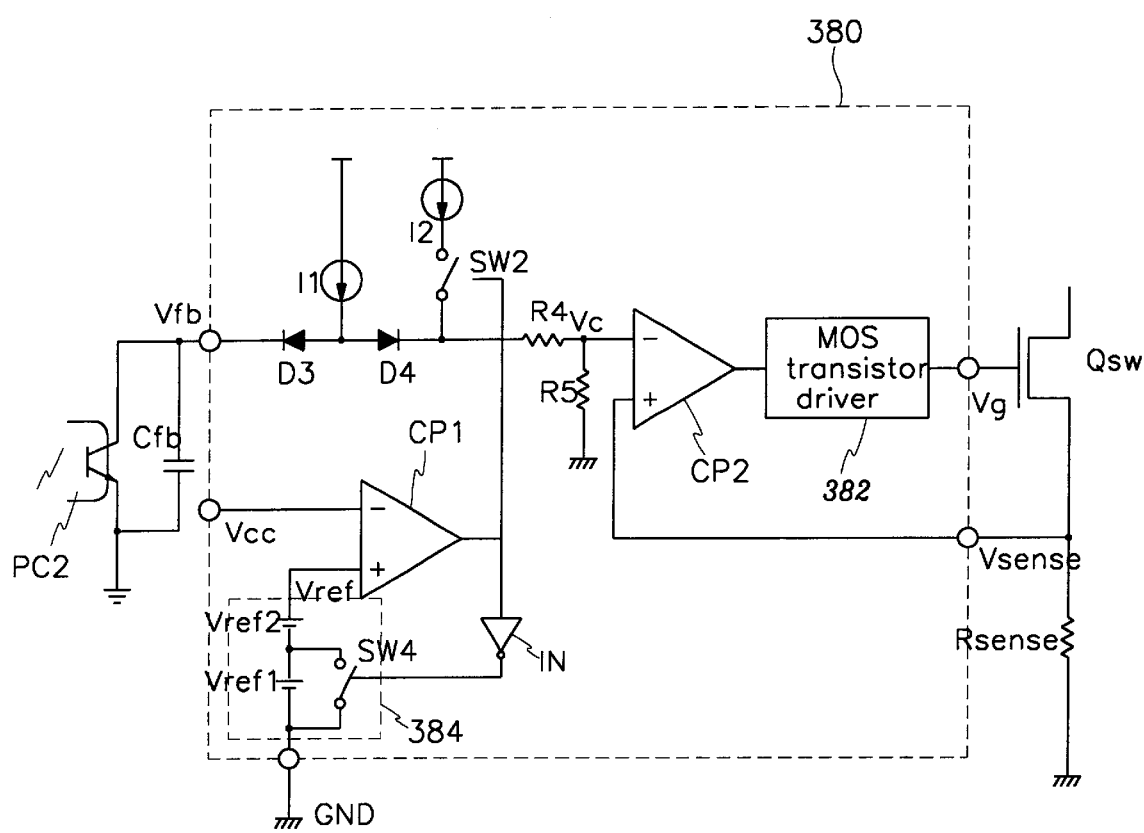
FIG. 4 is a more detailed schematic diagram of the control module of FIG. 3.

FIG. 4 is a more detailed schematic diagram of the control module 380 of FIG. 3. As shown in FIG. 4, in addition to several components described above in connection with FIG. 1, the control module includes comparators CP1 and CP2, a metal oxide semiconductor (MOS) transistor driver 382, which may be a conventional integrated circuit driver such as the KA3S0765R manufactured by Fairchild Korea Semiconductor Ltd, an inverter IN, and a reference voltage generator 384. The reference voltage generator 384 further includes reference voltages Vref1 and Vref2 and a switch SW4. The output of the comparator CP1 controls the state of the switch SW2 based on the level of the supply voltage Vcc, which is applied to an inverting terminal of the comparator. When the output of the comparator CP1 is high, the switch SW2 is closed so that the current source I2 provides current to the resistors R4 and R5 and the switch SW4 is open so that a voltage equal to the sum of the reference voltages Vref1 and Vref2 is applied to a non-inverting terminal of the comparator CP1. On the other hand, when the output of the comparator CP1 is low, the switch SW2 is open so that the current source I2 does not provide any current to the resistors R4 and R5 and the switch SW4 is closed so that only the reference voltage Vref2 is applied to the non-inverting terminal of the comparator CP1.

In the normal mode of operation, the supply voltage Vcc is greater than the sum of the reference voltages Vref1 and Vref2, which holds the switch SW2 in the open condition and the switch SW4 in the closed condition. When the power supply described herein enters the low power burst mode operation, the control voltage Vc is initially substantially near zero volts and the output of the transistor driver 382 is off. As a result, the supply voltage Vcc begins to decrease. Because the reference voltage Vref1 is shorted by the switch SW4, when the supply voltage Vcc falls below the reference voltage Vref2, the output of the comparator changes state to close the switch SW2 and open the switch SW4.

With the switch SW2 closed, the current source I2 provides a current to the resistors R4 and R5 which generate a control voltage Vc, as described above, that causes the MOS transistor driver 382 to drive the power switch Qsw at a fixed frequency having about a minimum allowable duty cycle. As a result the supply voltage Vcc begins to increase and, when the supply voltage Vcc exceeds the sum of the reference voltages Vref1 and Vref2, the output of the comparator CP1 again changes state to open the switch SW2 and close the switch SW4. Thus, as long as the power supply remains in the low power burst mode of operation, the comparator CP1 will operate the switches SW2 and SW4 so that the supply voltage Vcc limit cycles between about the reference voltage Vref2 and the sum of the reference voltages Vref1 and Vref2.

FIG. 5 is a graphical representation of signals associated with the switching power supply circuit of FIGS. 1, 3 and 4. Graph (A) illustrates the supply voltage Vcc in the normal mode of operation and in the low power burst mode (i.e., the standby mode) of operation. As shown in graph (A), the supply voltage Vcc in the normal mode of operation equals Vcc.N. When the power supply enters the low power burst mode of operation, the supply voltage Vcc decreases to about the reference voltage Vref2 at which point, as described above, the supply voltage begins to increase to above the sum of the reference voltages Vref1 and Vref2. As can be seen graph (A), in the low power burst mode of operation, the supply voltage Vcc limit cycles between about reference voltage Vref2 and the sum of the reference voltages Vref1 and Vref2.

Graph (B) of FIG. 5 shows the output voltage Vout of the power supply in both the normal mode and standby mode of operation. As shown in graph (B), the output voltage in the standby mode of operation is reduced to some fraction (by the multiplier K, which is less than 1) of the normal mode output voltage Vout.N.

Graph (C) of FIG. 5 shows that the feedback voltage Vb is substantially near zero volts in the low power mode of operation and substantially greater than zero volts in the normal mode of operation. Additionally, graph (C) shows how the voltage Vb (which is analogous to the control voltage Vc) has a continuous characteristic in the normal mode of the operation and becomes a periodic waveform in the low power mode of operation.

A range of changes and modifications can be made to the preferred embodiment described above. The foregoing detailed description should be regarded as illustrative rather than limiting and the following claims, including all equivalents, are intended to define the scope of the invention.

What is claimed is:

1. A switching power supply, comprising:
   a mode controller that provides a first mode control signal and a second mode control signal;
   a feedback circuit coupled to the mode controller that provides a first feedback signal based on the first mode control signal and a second feedback signal based on the second mode control signal; and
   a switching controller coupled to the feedback circuit that generates a continuous fixed frequency signal in response to the first feedback signal and a series of fixed frequency burst signals in response to the second feedback signal.

2. The switching power supply of claim 1, wherein the mode controller comprises a resistive network coupled to an output voltage of the switching power supply.

3. The switching power supply of claim 1, wherein the first and second mode control signals are voltage signals.

4. The switching power supply of claim 1, wherein the first mode control signal is associated with a normal mode of operation of the switching power supply and the second mode control signal is associated with a low power mode of operation of the switching power supply.

5. The switching power supply of claim 4, wherein the low power mode of operation is associated with a standby condition.

6. The switching power supply of claim 1, wherein the feedback circuit comprises a voltage-controlled current source that is responsive to the first and second mode control signals.

7. The switching power supply of claim 1, wherein the first feedback signal varies continuously in response to changes in an output signal of the switching power supply.

8. The switching power supply of claim 1, wherein the second feedback signal is substantially independent of variations in an output signal of the switching power supply.

9. The switching power supply of claim 8, further comprising a switch driver, wherein the second feedback signal causes the switching controller to generate a periodic control signal that cycles the switch driver between on and off conditions.

10. The switching power supply of claim 9, wherein the periodic control signal causes the switch driver to provide a drive signal having bursts of a fixed frequency oscillation.

11. The switching power supply of claim 9, wherein the periodic control signal has a first magnitude associated with a minimum duty cycle within the on condition of the switch driver and a second magnitude associated with the off condition of the switch driver.

12. The switching power supply of claim 1, wherein the feedback circuit comprises a photo transistor.

13. A switching power supply, comprising:
   a power switch;
   a mode controller that provides a mode control signal having a first level associated with a normal mode of operation of the switching power supply and a second level associated with a standby mode of operation of the switching power supply;
   a feedback circuit coupled to the mode controller having a voltage-controlled current source that provides a feedback current which varies in response to the mode control signal; and
   a switching controller coupled to the feedback circuit and the power switch, wherein the switching controller switches the power switch in response to the feedback current so that in the normal mode of operation the power switch switches continuously at a predetermined frequency and in the standby mode of operation the power switch is switched on and off in bursts having a predetermined frequency.

14. The switching power supply of claim 13, wherein the bursts comprise an oscillating signal that oscillates at the predetermined frequency and has a duty cycle associated with a minimum duty cycle of the switching controller.

15. The switching power supply of claim 13, wherein in the normal mode of operation the feedback current varies continuously with an output voltage of the switching power supply.

16. The switching power supply of claim 13, wherein in the standby mode of operation the feedback current produces a feedback voltage that is substantially independent of an output voltage of the switching power supply.

17. The switching power supply of claim 13, wherein in the standby mode of operation the power switch is switched on and off in response to a supply voltage within the switching controller.

* * * * *